Dec. 9, 1969     J. B. MAJERUS     3,483,548

SYNCHRO ACTUATED SWITCH SYSTEM

Filed May 31, 1966     2 Sheets-Sheet 1

INVENTOR.
JOHN B. MAJERUS
BY Mordy & Hallacher
ATTORNEYS

INVENTOR.
JOHN B. MAJERUS
BY Moody & Hallaher
ATTORNEYS

United States Patent Office 3,483,548
Patented Dec. 9, 1969

3,483,548
SYNCHRO ACTUATED SWITCH SYSTEM
John B. Majerus, Cedar Rapids, Iowa, assignor to Collins Radio Company, Cedar Rapids, Iowa, a corporation of Iowa
Filed May 31, 1966, Ser. No. 553,923
Int. Cl. H04l 3/00; H03k 13/00
U.S. Cl. 340—347                                    8 Claims

ABSTRACT OF THE DISCLOSURE

A distance responsive switching system for use in aircraft distance measuring equipment which switches from horizontal ground speed measuring equipment to speed memory means when the measured distance between an aircraft and a ground station falls within a pre-selected minimum.

---

This invention relates generally to selectively switch closing circuitry and particularly to a range responsive circuit for utilization with Distance Measuring Equipment (DME).

The circuit herein described is used in ground speed equipment which is an accessory unit to be used with distance measuring equipment (DME). The DME measures the actual distance from an aircraft to a ground station and thus measures slant distance. The horizontal distance between aircraft and ground station is not measured. Since the horizontal component of speed is necessary for an accurate ground speed measurement it is necessary to account for slant distance is instances where distance is differentiated to provide speed. The horizontal speed can be obtained from the slant distance between the aircraft and ground station by differentiating the slant distance and inserting an altitude factor. The altitude correction is particularly important at close ranges when the slant angle is large. At long ranges the slant is small and therefore becomes insignificant beyond ranges exceeding 30 miles. The instant invention avoids the necessity of inserting a correction factor at close ranges by placing the speed circuit in memory at distances where slant errors are large, i.e., close to the ground station. The ground speed as measured at longer ranges is "remembered" for the period when the indicated ground speed is the accurate value obtained at a distance where slant range error is negligible. Of course the ground speed can also be measured by other means during the "close in" instances. During the memory period the velocity circuitry is removed from the measuring system. A trip switch is required to effect this removal of the velocity circuitry from the system. Because the slant angle error becomes significant at close ranges a determination of the accuracy required must be made and a range selected. Normally the selected range will be between 0 and 20 or 0 and 30 miles. The interval chosen is a compromise between length of memory and indicated speed accuracy during memory, obviously longer or shorter ranges can be selected according to the accuracy required.

It is therefore an object of this invention to provide distance responsive circuitry utilized in distance measuring equipment.

It is another object to provide such circuitry which gives an accurate indication of slant, or actual range between a vehicle and a ground fixed station.

It is another object to provide such circuitry which simultaneously gives accurate slant range and horizontal ground speed indications, independently of one another.

It is another object to provide such circuitry which removes horizontal ground speed measuring equipment from the overall DME system during ranges within a selected minimum.

Further objects, features, and advantages of the invention will become apparent from the following description and claims when read in view of the accompanying drawings wherein like numbers indicate like parts and in which:

Figure 1:
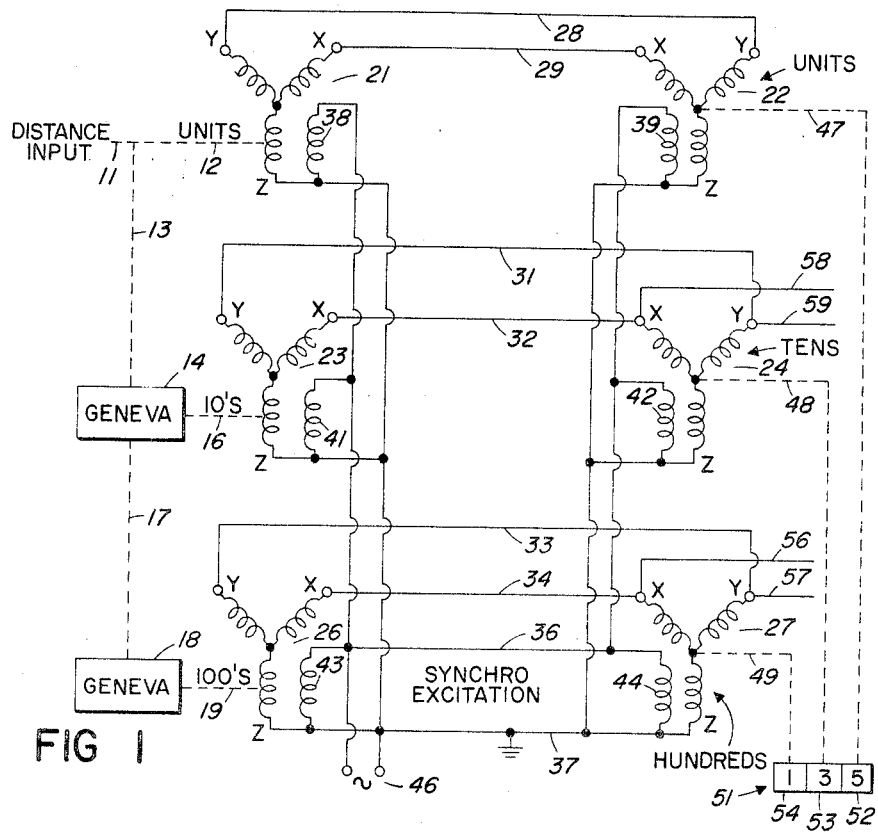
FIGURE 1 shows a generalized circuit diagram of commonly used DME.

In many DME systems presently used distance information is derived from rotation of a shaft and transmitted to remote indicators via three synchro transmitters in decades of units, 10's and 100's. The shaft motion of the units synchro is continuous, while the motion of the 10's and 100's synchros is intermittent, as a result of Geneva drive mechanisms. Such a system is shown in FIGURE 1. The distance signal is received upon a shaft 11 the rotation of which is indicative of the distance to be measured, for example, a revolution of the shaft is frequently used to indicate 10 miles of distance. Shaft 11 is coupled to a unit synchro 21 by means of a mechanical coupling 12. Shaft 11 is also connected by mechanical coupling 13 to 10's synchro 23 through Geneva 14 and mechanical linkage 16. Shaft 11 is further coupled to the 100's synchro 26 through mechanical linkage 17, Geneva 18 and mechanical linkage 19. Synchro 21 is electrically connected via lines 28 and 29 to synchro 22. Synchro 23 is connected via lines 31 and 32 to synchro 24 and synchro 26 is connected via lines 33 and 34 to synchro 27. An energizing souce is applied to the excitation input of the synchro system such that coils 38, 39, 41, 42, 43 and 44 are similarly energized. Because of the electrical connections between the paired synchros mechanical motion of the input synchros 21, 23, and 26 is identically translated to the output synchros 22, 24, and 27, as is well known in the art. Output synchro 22 is connected via linkage 47 to the units portion of indicator 51. Output synchros 24 and 27 are similarly connected via linkages 48 and 49 respectively to the 10's and 100's indications of indicator 51. In this manner as shaft 11 causes rotation of synchro 21 synchro 22 is caused to similarly rotate and thereby cause a change of indicator 51. The rotation of shaft 11 also causes intermittent rotation of Geneva 14 such that the 10's portion of the distance signal is translated via synchro 23 to synchro 24 to the 10's portion 53 of indicator 51. The 100's portion 54 of indicator 51 is likewise actuated by shaft 11 through Geneva 14 and Geneva 18. Output synchro 24 is connected to have two electrical outputs 58 and 59 respectively designated as the 10's-X and 10's-Y output. Output synchro 27 likewise has two electrical outputs 56 and 57, respectively, designated as the 100's-X and 100's-Y outputs. The electrical connection of these outputs into the switching system of this invention is best understood by reference to FIGURE 2.

Figure 2:
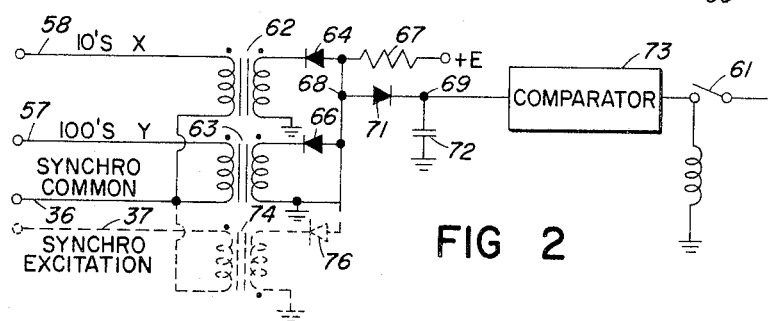
FIGURE 2 shows the inventive circuitry as it is used for a distance from 0 to 30 miles.

FIGURE 2 shows the circuit used to derive the 0 to 30 mile actuation of switch 61. The inputs are the 10's-X and 100's-Y voltages from lines 58 and 57 respectively of FIGURE 1 and also synchro common or ground 37. Transformers 62 and 63 are isolation transformers with nominal turns ratio of 1:1. They provide a chassis ground point since the synchro common is not always chassis ground. Other turn ratios may be used depending on the preset level as described later.

Figure 4:
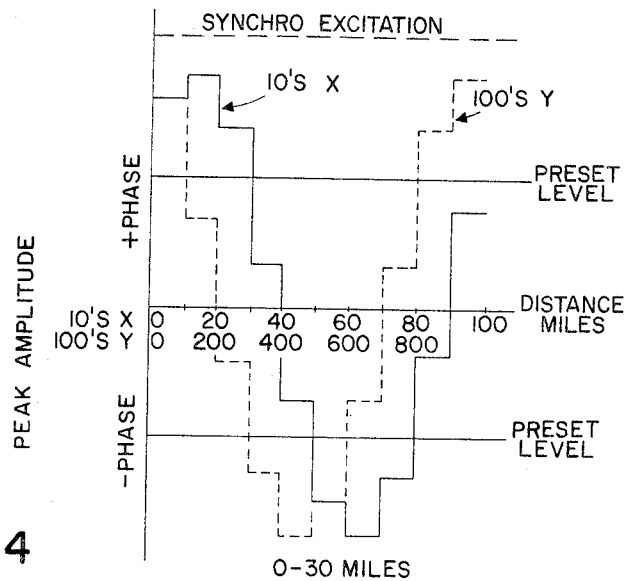
FIGURE 4 shows a graph of the synchro voltage outputs v. distance pertinent to the 30 mile circuit.

In FIGURE 2 diodes 64, 66 and resistor 67 form an AND circuit. When no voltage is provided by either transformer 62 or 63 diodes 64 and 66 are in conduction and current is supplied through resistor 67. When the cathodes of both diodes are driven positive at the same time by the signals from transformers 62 and 63 due to actuation of the 10's-X and 100's-Y by rotation of synchros 24 and 27 respectively, point 68 will rise to a positive value equal to the smaller of the two voltages on the cathodes of the diodes. When the output of the AND circuit is positive (½ sinusoid), a direct voltage is provided at point 69 by peak charging circuit composed of diode 71 and capacitor 72. The comparator 73, which may be of any kind that provides high input impedance, is adjusted to close output switch 61 when the voltage at 69 is more positive than a given level, referred to as the preset level. The selecting of the preset level can be understood by viewing FIGURE 4. The output voltages of the 10's and 100's synchros, 24 and 27 respectively, are standard synchro indexing. The preset level is a function of the excitation voltage applied at terminals 46. FIGURE 4 is a plot of peak value of X and Y synchro voltages versus distance for the 10's-X and 100's-Y synchros. The upper scale is the distance calibration for the 10's-X and the lower scale of the 100's-Y. In the interval 0 to 30 miles the 10's-X and 100's-Y voltages are in phase and both exceed the preset level; thus the output switch 61 is closed. Closing of switch 61 removes the velocity equipment from the system. In the interval 30 to 40 miles, the 10's-X voltage is below the preset level; thus output switch 61 is open. In the interval 40 to 90 miles, the 10's-X voltage is 180° out of phase with the 100's-Y voltage, the cathodes of 64 and 66 are not driven positive at the same time, and output switch 61 is open. In the interval 90 to 100, the 10's-X voltage is below the preset level, and output switch 61 is open. In the interval 100 to 300 miles, the 100's-Y voltage is below the preset level, and output 61 switch is open. The maximum range of the DME is ordinarily 300 miles and therefore ranges beyond this are not usually important. However, as an extension of the requirements of the DME, a range to 800 miles can be provided if a third input 36 (as shown dotted in FIGURE 2) is provided to the AND circuit from the synchro excitation voltage. Phase reversal of the transformer 74 is required to yield the excitation phase shown in FIGURE 4. A third diode 76 is also added to the circuit. Now the circuit is a three input circuit where all three inputs must be positive at the same time to close switch 61. In FIGURE 4 in the interval 300 to 700 miles, the 100's-Y voltage is 180° out of phase with synchro excitation; thus the output switch 61 is open. In the interval 700 to 800 miles, the 100's-Y voltage is below the preset level; thus the output switch 61 is open.

Figure 3:
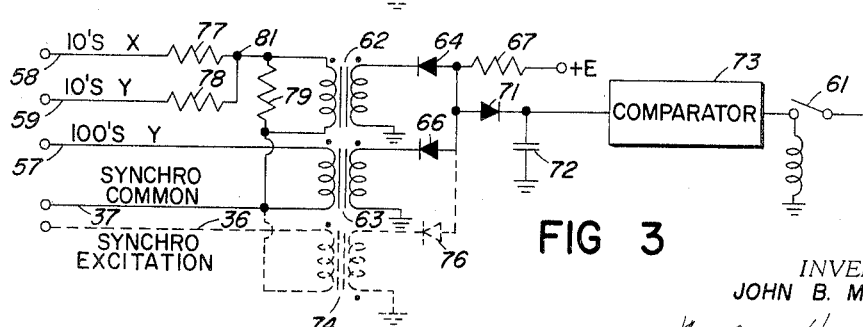
FIGURE 3 shows the inventive circuitry as it is used for a distance from 0 to 20 miles.

FIGURE 3 shows the circuit used to derive the 0 to 20 mile actuation of switch 61. The circuit is similar to the 0 to 30 mile circuit; the primary difference is the injection of 10's-X and 10's-Y voltages from lines 32 and 31 as shown in FIGURE 1 into transformer 62. Resistors 77, 78, and 79 form an adder to provide the following voltage at point 81.

$$V_c = (V_x + \tfrac{1}{4}V_y)\left(\frac{1}{N}\right) \quad \frac{1}{N} = \text{loss in adder}$$

Figure 5:
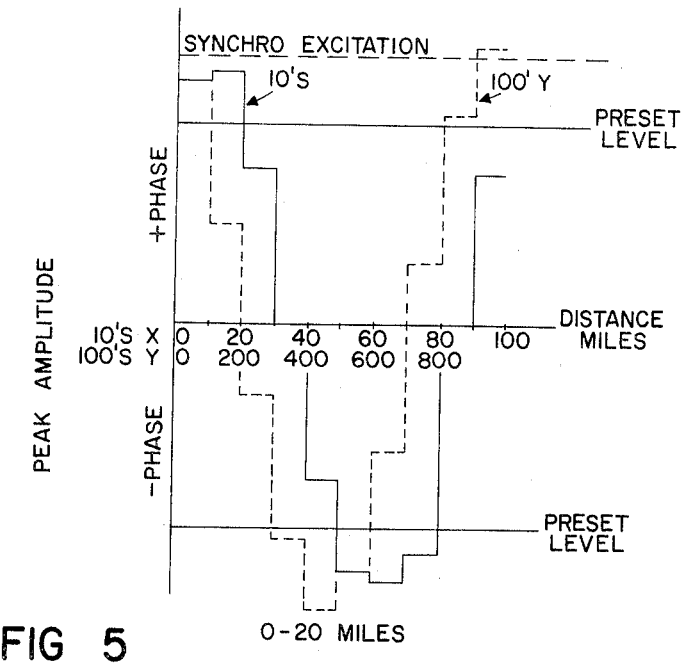
FIGURE 5 shows the synchro voltage outputs v. distance for distances pertinent to the 20 mile circuit.

Resistor 79 is not essential but is included to provide a resistive termination to the summing resistors, 77 and 78. The turns ratio of transformer 62 is normally N but it can be any value dependent on the preset level selected. FIGURE 5 shows a plot of peak values of voltages at the output of transformer 62 (10's) with turns ratio N. On the same figure the output of transformer 63 (100's-Y) is plotted where transformer 63 has a turns ratio of 1:1.25. The turns ratio of transformer 63 is selected to correspond to one such that 100's-Y voltage is larger than the preset level in the interval 0 to 100 miles and smaller than the preset level in the interval 100 to 300 miles.

Referring to FIGURE 5, in the interval 0 to 20 miles the 10's and 100's-Y voltages are in phase and both exceed the preset level and output switch 61 is closed. In the interval 20 to 100 miles, the 10's voltage is either 180° out of phase with the 100's-Y voltage or below the preset level; thus output switch 61 is open. In the interval 100 to 300 miles, the 100's-Y voltage is below the preset level; thus the output switch is open.

As in the case of the 0 to 30 mile switch, the range can be extended to 800 miles if the third AND input, synchro excitation, is used.

The voltage transitions of the 10's and 100's voltages shown in FIGURES 4 and 5 as abrupt are idealized. In practice the mechanical mechanisms cause transitions to occur over approximately the last 5% of a decade. This gradual transition is of no importance except in the interval 99.5 to 100 miles. In this case, the 10's-X or 10's voltage is moving to a point above the preset level while the 100's-Y voltage is moving to a point below the preset level. In order to maintain the output switch open, as desired, the 100's-Y voltage must go below the preset voltage before the 10's-X or 10's goes above the preset voltage. Alternatively a delay can be provided in the comparator in the direction of switch closure to avoid switch action during this short period. This is a design detail which causes no great difficulty in actual practice but which must be given attention.

Although this invention has been described with respect to a particular embodiment thereof, it is not to be so limited, as changes and modifications may be made therein which are within the spirit and scope of the invention as defined by the appended claims.

I claim:

1. In aircraft distance measuring equipment, a distance responsive switching sytsem for switching from horizontal ground speed measuring equipment to speed memory means when the measured distance between an aircraft and a ground station falls within a pre-selected minimum comprising: a plurality of synchro means for reducing a multidigit distance signal into its component members in decade fashion of units, tens, and hundreds, each of said plurality of synchro means having at least one electrical output for each decade, switch means for removing the speed measuring equipment and inserting the speed memory means, and an AND gate for actuating said switch means when at least one of said outputs from said tens synchro means and at least one of said outputs from said hundreds synchro means are present as inputs to said AND gate, said gate comprising a plurality of transformers, an equal plurality of voltage responsive means, and means biasing said voltage responsive means so that said AND gate generates an output only when each of said plurality of transformers is energized.

2. The system of claim 1 wherein said voltage responsive means are diodes.

3. The system of claim 1 wherein there are three transformers.

4. The system of claim 1 wherein each of said transformers receives a single input from different ones of said synchro means for reducing.

5. The system of claim 1 wherein said output switch is actuated by said AND gate through a third diode and a comparator.

6. The system of claim 1 wherein there are two transformers.

7. The system of claim 6 wherein one transformer receives the inputs from said tens synchro and the other of said transformers receives a single input from said hundreds synchro.

8. The system of claim 6 wherein each of said transformers receives a single input from different ones of said synchros.

References Cited

UNITED STATES PATENTS

| | | | |
|---|---|---|---|
| 2,832,021 | 4/1958 | Cantwell | 318—20.270 |
| 2,980,900 | 4/1961 | Rabin | 340—347 |
| 3,007,096 | 10/1961 | Tripp | 318—20.260 |
| 3,086,199 | 4/1963 | Shernizer et al. | 235—154 |
| 3,217,318 | 11/1965 | Masel | 340—347 |
| 3,265,904 | 8/1966 | Spencer | 318—20.340 |
| 3,167,758 | 1/1965 | Pullen | 340—347 |

MAYNARD R. WILBUR, Primary Examiner

JEREMIAH GLASSMAN, Assistant Examiner

U.S. Cl. X.R.

340—198